S. Holl,
Boring Hubs.
Nº 19,928.          Patented Apr. 13, 1858.
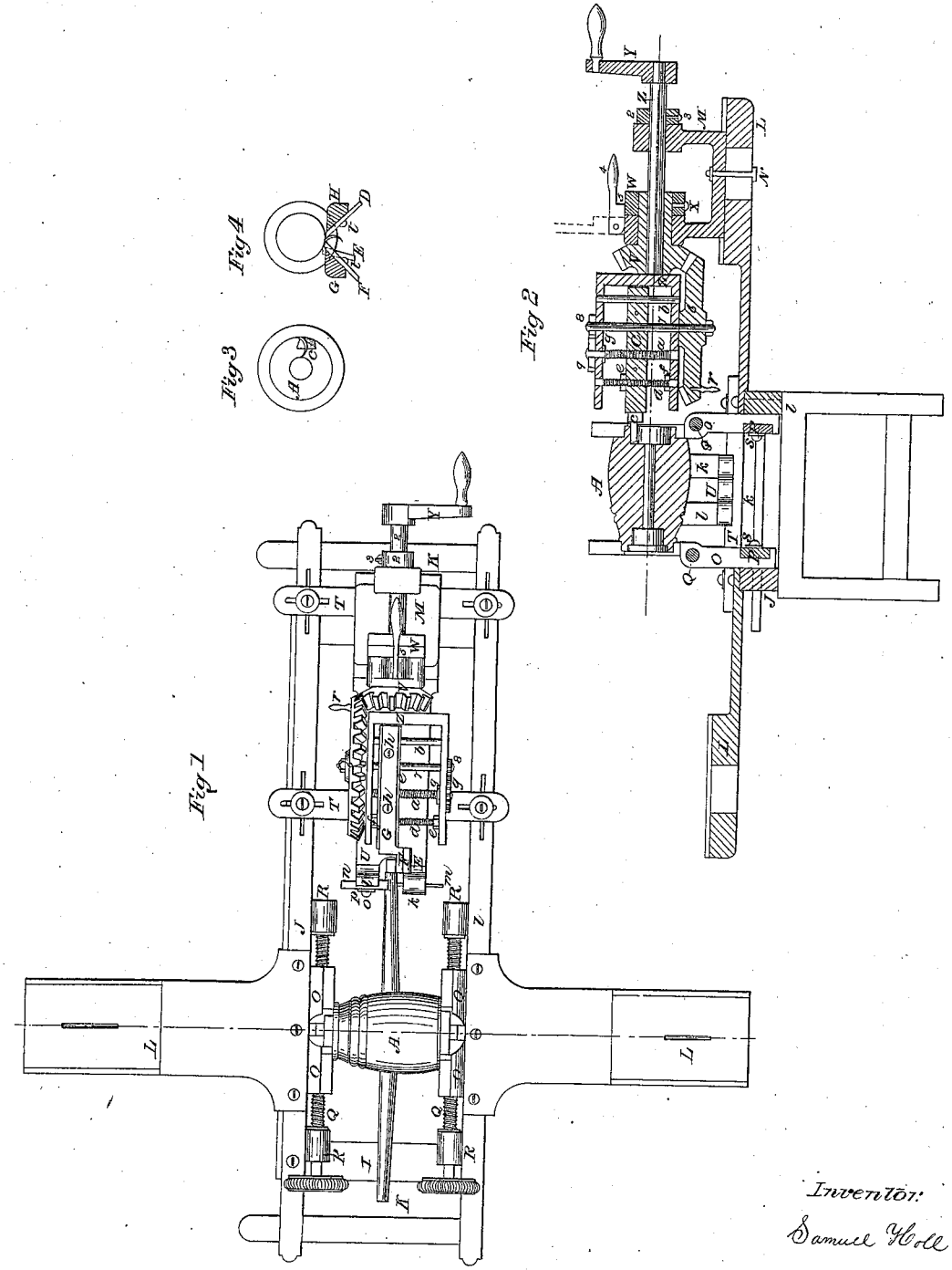
Inventor:
Samuel Holl

UNITED STATES PATENT OFFICE.

SAML. HOLL, OF READING, PENNSYLVANIA.

WHEELWRIGHT'S MACHINE.

Specification of Letters Patent No. 19,928, dated April 13, 1858.

*To all whom it may concern:*

Be it known that I, SAMUEL HOLL, of the city of Reading, county of Berks, and State of Pennsylvania, have invented certain Improvements in Spoke - Tenoning and Hub-Boxing Machines; and I do hereby declare that the following is a full, clear, and exact description of the construction and operation of the same, reference being had to the accompanying drawings, making a part of this specification, in which—

Figure 1 is a plan view. Fig. 2 is a transverse section through A. Fig. 3 represents an end view of the hub A with a section of the hub boxing knife C. Fig. 4 is an end view of the spoke and tenon with tenoning bit, D, cutter E, guard F, and carriers G, and H, represented as operating in tenoning.

I is a base frame work upon which sliding frame piece J, rests; K K are guides passing through J, and are secured into I; L L are side tables secured to frame I, and slide frame J, upon which headstock M, is placed for boxing hubs as represented in Fig. 2; N is a bolt to fasten headstock to table; O O O O are slide clamp rests which slide on guides P P, and are operated by screws Q Q, which have right and left threads which cause the slide clamps to move to or from each other by turning the screws; R R R R are bearings in which the screws revolve and are secured to guides P P and frames I, and J, with screws S S, Fig. 2; T T are cross pieces fastened to frames I, and J, and are firmly locked into table U, which forms a movable rest upon which headstock M, is fastened for tenoning; V is a bevel gear pinion passing through headstock M and is secured with collar W by set screw X; Z is a revolving crank shaft with square open end and revolves in pinion V and headstock M; Y is a crank secured to the end of revolving shaft Z by which the machine is operated; 2 is a collar secured to shaft Z with set screw 3 to keep shaft Z in proper place; 4 is a latch with joint on top of headstock M and catches in slots 5 on collar W; 6 is a bevel gear wheel meshing in pinion V and is secured to shaft 7 which passes through square open end of shaft Z; 8 is a small spur pinion secured to shaft 7 and meshes in spur gear 9 which is secured to feed screw $a$; $b$ is a guide for slide feed rest $c$; $d$ is a feed check screw furnished with check nuts $e$ and $f$, with the ends permanently secured into the frame on shaft Z; $g$ is a collar to keep feed screw $a$ in proper place; C is the knife for boxing hubs as shown in Fig. 2; G and H are bit and guard carriers secured to slide feed rest $c$ by means of screw $h$ $h$; $k$ and $l$ are steady posts for holding the spokes for tenoning; $m$ is a screw passing through against the spoke; $n$ is an adjustable rest with the one end slightly concaved into which the spoke is pressed by screw $m$; $o$ and $p$ are screw and washer to hold adjustable rest in proper place.

The hub with the spokes driven into it is placed between the clamp rest O O O O when the clamp rests are drawn toward each other by turning screws Q Q and clamp upon each end of the hub which in itself perfectly centers the hub both for tenoning and hub boxing. The spoke is pressed into the concave of adjustable rest $n$ by screw $m$, crank Y is turned, the latch prevents bevel pinion V from revolving with shaft Z, and causes bevel gear 6 to revolve on its axis while rotating around and meshing in bevel pinion V, the small spur pinion 8 meshes into spur gear 9 and causes feed screw $a$ to revolve and moves the slide feed rest toward the center of shaft Z, when the bit D and cutter E with guard F revolve around the spoke and cut a perfect tenon; the bit D cuts the full length of the tenon by the central feed motion. When the tenon is cut to proper size the slide feed rest is against the check nut $f$, Fig. 1, whereon the latch 4 is raised as shown in dotted lines Fig. 2 and the bevel pinion V revolves with shaft Z which at once stops the feed motion and causes the tenon to be finished perfectly smooth. The bevel gear wheel 6 is now turned in opposite direction by crank handle $r$ which backs the slide feed res $c$, bit D, &c., from the tenon sufficient for the next spoke to enter; the screw $m$ is next unscrewed the wheel turned to next spoke and fastened as above described.

The latch 4 is dropped into shaft 5 and the operation repeated. The bit D and guard F as shown in Fig. 4 may be set in such a position by screws $t$ $t$ on carriers G and H as to cut either tapered or straight tenons as may be desired. The small cutter E is secured to the end of carrier G and serves to cut a perfect square shoulder to the spokes.

For boxing the hub the headstock M is fastened on table L as represented in transverse section Fig. 2, the carriers G and H are taken off of the slide feed rest c and boxing knife C is screwed thereon, the crank Y is turned in an opposite direction to that of tenoning which causes the feed motion to feed from the center toward the circumference, the check nut $f$ is set to proper distance on check feed screw $d$ for the proper sized hole desired, and the same operation with latch 4 and bevel gear 6 as aforesaid. The slots in frame 1 and 3 and in cross pieces T T serve to adjust the tenoning operation for different sized wheels; also the slot in tables L L and the adjustable frame J for different lengths of hubs.

The feed motion of my invention may be simplified by making a feed screw of shaft 7 and dispensing with screw $a$ and spur gear 8 and 9; the screw however on shaft 7 would be so fine that it would not be durable; the bevel and spur gear are two to one which gives one revolution to the feed screw $a$, to four of shaft Z; the screw therefore for single gearing would be twice as fine as the one herein represented.

Having thus fully described my machine I will show the advantages which I claim: First the advantage of cutting the whole length of the tenons from the circumference of the spokes toward the center thereby economizing time and labor to what all other tenoning machines require as they commence cutting at the end of the spokes against the grain of the wood; consequently their cutters or bits cannot compete with mine for economy and durability. Second the advantage of my machine answering the double purpose of tenoning and hub boxing on the same frame or table work without removing the wheel.

I am aware that gearing of different kinds have been heretofore used but I am not aware that this device or motion of gearing has been heretofore used for the purpose herein specified; I therefore do not broadly claim the gearing separate; but What I do claim and desire to secure by Letters Patent is—

1. The sliding feed rest $c$ or anything essentially the same in combination with the devices of the open ended shaft Z, bevel gearing V and 6, check screw $d$, and nuts $e$ and $f$, also feed screw $a$, shaft 7, spur gear 8 and 9, and guide $b$, when arranged as described and used for the purpose herein set forth.

2. I also claim the combination and arrangement of the device for cutting tenons and boxing hubs without removing the wheel from the machine substantially and as for the purpose set forth.

SAMUEL HOLL.

Witnesses:
G. S. KINSEY,
MATTHIAS MENGEL.